(12) United States Patent
Kinoshita et al.

(10) Patent No.: US 6,484,067 B1
(45) Date of Patent: *Nov. 19, 2002

(54) INDUSTRIAL ROBOT

(75) Inventors: Satoshi Kinoshita; Jun Ibayashi, both of Oshino-mura (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,637

(22) PCT Filed: Jul. 14, 1998

(86) PCT No.: PCT/JP98/03156

§ 371 (c)(1),
(2), (4) Date: Feb. 19, 1999

(87) PCT Pub. No.: WO99/03649

PCT Pub. Date: Jan. 28, 1999

(30) Foreign Application Priority Data

Jul. 14, 1997 (JP) .............................. 9-205215

(51) Int. Cl.[7] .......................... G06F 19/00; F16C 3/14; F16J 15/50
(52) U.S. Cl. .................. 700/245; 508/100; 277/534
(58) Field of Search ................................ 700/245, 231, 700/239, 247, 248; 452/30; 508/100, 104, 105, 113, 138, 308, 486, 487, 489; 507/265; 277/394, 504, 534, 590; 184/6.8–6.9, 18–20

(56) References Cited

U.S. PATENT DOCUMENTS

| | | | | |
|---|---|---|---|---|
| 4,557,662 A | * | 12/1985 | Terauchi et al. | 414/744.5 |
| 4,922,435 A | * | 5/1990 | Cahlander et al. | 700/247 |
| 5,352,150 A | * | 10/1994 | Markwardt | 452/30 |
| 5,386,762 A | * | 2/1995 | Gokey | 99/326 |
| 5,456,679 A | * | 10/1995 | Balaban et al. | 604/892.1 |
| 5,538,654 A | * | 7/1996 | Lawate et al. | 508/308 |
| 5,981,448 A | * | 11/1999 | Matsui et al. | 508/101 |

FOREIGN PATENT DOCUMENTS

EP         0 382 512 A1     8/1990

(List continued on next page.)

OTHER PUBLICATIONS

"Get a Grip On Robotics—6 Degrees of Freedom", http://www.thetech.org/hyper/robots/6deg/6deg.html (p. 1 of 1), print date indicated as Aug. 20, 2001.

(List continued on next page.)

*Primary Examiner*—William A. Cuchlinski, Jr.
*Assistant Examiner*—Thu Nguyen
(74) *Attorney, Agent, or Firm*—Staas & Halsey LLP

(57) ABSTRACT

An industrial robot comprises a column 1 fixed to an installation base BS, a first axis J1, which is a linear movement axis, a second axis J2 and a third axis J3, which are rotational axes, and a fourth axis J4 in the form of a driving axis (rotational axis) of a working tool. A food grade lubricating oil is used for the linear guide (2), ball screw (5), bearing (6), speed reducers (9, 19) and gears (10, 20, 30) of these axes. Oil seals (15, 25, 35) for sealing the food grade lubricating oil are made from a material which is harmless to human bodies, for example, a fluorine resin material, in consideration of their wear.

4 Claims, 1 Drawing Sheet

FOREIGN PATENT DOCUMENTS

| | | | | |
|---|---|---|---|---|
| JP | 57116970 | 7/1982 | | |
| JP | 61-79585 | 4/1986 | | |
| JP | 61-254633 | 11/1986 | | |
| JP | 63-117632 | * 5/1988 | ................. | 310/88 |
| JP | 1-228792 | 9/1989 | | |
| JP | 2-138587 | 5/1990 | | |
| JP | 5-209187 | 8/1993 | | |
| JP | 5-262333 | 10/1993 | | |
| JP | 7-32284 | 2/1995 | | |
| JP | 7-167303 | 7/1995 | | |
| JP | 7-173480 | 7/1995 | | |
| JP | 8-104863 | 4/1996 | | |
| JP | 8-226548 | 9/1996 | | |
| WO | WO 87/01646 | 3/1987 | | |

OTHER PUBLICATIONS

"Get a Grip On Robotics—6 Degrees of Freedom", http://www.thetech.org/hyper/robots/6deg/6deg_help.html (p. 1 of 1), print date indicated as Aug. 20, 2001.

"Degrees of Freedom", http://www.robotics.utexas.edu/rrg/education/low_education/degrees_of_freedom/main.htm (p. 1 of 3 and 2 of 3), print date indicated as Aug. 20, 2001.

Communication from the European Patent Office mailed Sep. 25, 2001 (3 pages), including Supplemental European Search Report dated Sep. 18, 2001.

* cited by examiner

INDUSTRIAL ROBOT

TECHNICAL FIELD

The present invention relates to an industrial robot, and more particularly, to an industrial robot which is employed in workplaces involved in processing, manufacture, transfer, packaging, dispatch, or the like, of products relating to foodstuffs, medical care or hygiene.

BACKGROUND ART

An industrial robot (hereinafter, simply referred to as "robot") involves in its structure a large number of mechanical elements, such as speed reducers, gears, ball screws, bearings, linear guides, and the like, in its moving parts. In order to maintain smooth movement of the mechanical elements used in these moving parts, it is common to use a mineral lubricating oil. This lubricating oil is introduced and held in a sealed structure provided in the robot mechanisms, and it is necessary to change the lubricating oil when it deteriorates, even if it is supposed that the oil is sealed and held in a complete manner, and the lubricating oil is liable to leak or scatter outside while being discharged and replenished. Moreover, the same possibility arises when parts in the vicinity of the region where the lubricating oil is held are serviced, inspected, changed, or the like.

Therefore, when a conventional robot is used in a workplace involved in processing, manufacturing, transferring, packaging, shipping, or the like, relating to foodstuffs, medical care or hygiene, it is extremely difficult to eliminate completely the possibility of mineral-type lubricating oil adhering to or infiltrating the foodstuff, medical or hygiene-related products handled by the robot, or the wrapping or packaging thereof.

Furthermore, a large number of seals, such as oil seals, and the like, are used in the moving parts of robots, for the purpose of preventing leakage of lubricating oil or infiltration of dust, and with their wearing and deterioration, leaking of lubricating oil is also liable to occur.

Moreover, in general, rubber materials are used for seals, and it is not possible to avoid generation of powder from the rubber as the seals wear. However, generally used rubber-based materials contain a considerable amount of harmful substances, and there is a risk that the powder of rubber material due to wearing, which is discharged from externally exposed seals, may adhere to or infiltrate the foodstuff, medical or hygiene-related products being handled, or their wrapping or packaging, and the like, thereby causing their contamination.

Since the aforementioned mineral lubricating oil and the powder of rubber material caused by wearing, which may possibly be discharged or leak outside, contain substances which are harmful to human bodies when absorbed, then in cases where a conventional robot is used in tasks of handling products relating to foodstuffs, medical care or hygiene, it is difficult to guarantee safety. and a large burden is involved in servicing and inspection tasks. Consequently, this has been a major drawback to the introduction of robots into the fields where it is required that any substances discharged are entirely harmless, such as the field of manufacturing and processing food products.

DISCLOSURE OF THE INVENTION

It is an object of the present invention to provide a robot which is suited to tasks which require that any substances discharged are entirely harmless, such as the tasks of manufacturing, transferring, wrapping, packaging and the like of products related to foodstuffs, medical care, hygiene, and the like.

In order to achieve the aforementioned object, the industrial robot according to the present invention is an industrial robot to be employed in a workplace involved in processing or manufacturing of foodstuffs, comprising a sealed structure in the robot mechanism, wherein a harmless lubricating oil, such as polyurethane-base lubricating oil, is used in the mechanical elements contained inside the sealed structure.

Further, a material which is not harmful to human bodies, such as nitrile rubber, fluorine resin or the like, is used for the seals included in moving parts.

Since the robot according to the present invention uses lubricating oil and seals which are safe for human bodies in the mechanical elements incorporated into the moving parts thereof, it is possible to avoid the danger of causing a discharge of lubricating oil or powder produced by wearing of the seals that are harmful to human bodies, even if the robot is used in the tasks of processing, manufacturing, transferring, wrapping, packaging, etc. of products relating to foodstuffs, medical care or hygiene. Moreover, according to the present invention, by making a robot harmless in terms of the substances discharged thereby, a factor impeding the introduction of robots into the aforementioned tasks can be removed.

BEST MODE FOR CARRYING OUT THE INVENTION

Figure 1:
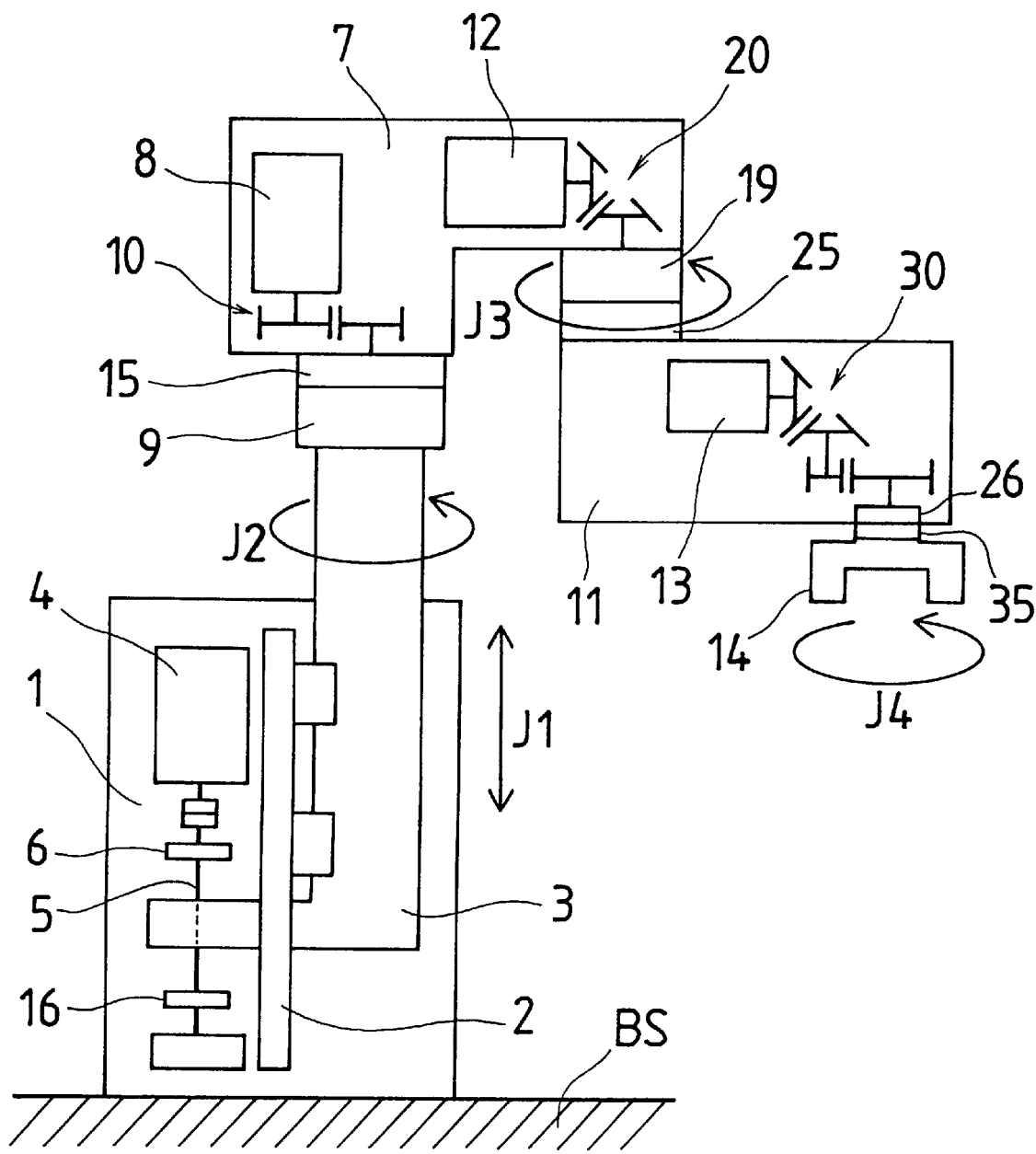
FIG. 1 is a diagram schematically showing the structure of one example of an industrial robot according to the present invention.

The general structure of one example of a robot according to the present invention is now described with reference to FIG. 1.

A large number of machine elements, such as speed reducers, gears, ball screws, bearings, linear guides and the like, which are described hereinafter, are used in the moving parts of this robot. These machine elements are contained inside a sealed structure provided in the robot mechanism, and supplied with a lubricating oil which is not harmful to human bodies.

The first axis J1 of the robot is a linear movement axis, and a slider 3 is supported for linear movement on a linear guide 2 provided on a column 1 which is fixed to an installation base BS. The rotation of a first axial motor 4 is converted into linear movement by means of a ball screw 5, both ends of which are supported by bearings 6, 16.

The second axis J2 of the robot is a rotational axis; a second axis arm 7, a second axis motor 8 and a speed reducer 9 are mounted on the top end of the slider 3, the second axis motor 8 drives the speed reducer 9 by means of the gear 10, and the output shaft of the speed reducer 9 drives the second axis arm 7.

The third axis J3 of the robot is a rotational axis; a third axis arm 11, a third axis motor 12 and a speed reducer 19 are mounted on the end of the second axis arm 7, the third axis motor 12 drives the speed reducer 19 via a gear 20, and the output shaft of the speed reducer 19 drives the third axis arm 11.

By means of the foregoing composition, the robot arms have three-dimensional freedom of movement.

The fourth axis of the robot is also a rotational axis, and this rotational axis is provided in the form of the drive shaft of a working tool 14 attached to the implement end of the robot. In other words, a gear 30 connected to the output shaft of the fourth axis motor 13 is provided on the end portion of the third axis arm 11, and the fourth axis motor 13 drives the working tool (for example, a hand, liquid injecting device, or the like) via the gear 30, such that its orientation can be adjusted.

In this way, the drive mechanisms for the axes J1–J4 of the robot include a large number of mechanical elements which require lubricating oil, such as speed reducers 9, 19, gears 10, 20, 30, ball screw 5, linear guide 2, bearings 6, 16, 26, and the like, and, in this robot, lubricant which is confirmed to be safe, such as a "Food Grade Lubrication" or "Food Grade Grease", or a polyurethane lubricant, is used for these machine elements. Specific examples of obtainable lubricants of such kind include Amoco Food Grease (registered trademark) and Neverstain HT/AW (registered trademark).

Incidentally, the lubricating oil to be used for the aforementioned parts may be a food grade lubricant other than those mentioned above, provided that it has been confirmed to be harmless to human bodies. International standards specifying harmlessness to human bodies have been set by the U.S.D.A (U.S. Department of Agriculture), and it is practical to use substances having grade H1 or H2 under this standard.

The output shafts of the second axis J2, third axis J3 and fourth axis J4 are provided with oil seals 15, 25, 35 respectively, and the aforementioned harmless lubricating oil is contained inside these oil seals 15, 25, 35, thereby preventing leaking of the lubricating oil or infiltration of dust. A material which is confirmed to be harmless to human bodies is used for the oil seals 15, 25, 35, in consideration of the possibility that fine powder due to abrasion may be scattered as the oil seals wear.

More specifically, it is possible, for example, to obtain rotational seals which use nitrile rubber containing a reduced level of harmful components, such as MN857 manufactured by Musashi Oil Seal Industries Co. Ltd. or fluorine resin, (PTFE=polytetrafluoroethylene). Needless to say, it is also possible to use other seal materials, provided that they are confirmed to be harmless to human bodies.

Japanese standards specifying harmlessness of wearing components with respect to human bodies are laid down by Notification No.85 of the Ministry of Health and Welfare, and it is practical to use a material conforming to these standards.

In the case where this robot is used, for example, in holding or transporting foodstuffs or foodstuff containers, or the like, or injecting liquids, etc. during the manufacture or processing of foodstuffs, or in subsequent wrapping and packaging processes, and the like, if leak of lubricating oil should occur during operation, and if such leak should be overlook ed because of being too small in volume to be noticed, there will be no risk of placing human bodies in danger. Similarly, there is no risk that contamination by powder produced by the wear of the oil seals will do harm to human bodies.

Further, when changing the lubricating oil or oil seals or is during servicing and inspection, leaking of lubricating oil and scattering of powder resulting from wear of the oil seals is particularly liable to occur, but, in the case of the robot according the present invention, unlike the conventional robots, even if a small volume of leaking or scattering occurs, no serious circumstances will arise, and, therefore it is possible to reduce the burden of tasks involved in replacing, servicing and inspecting components of the robot (including the burden of removing the robot itself from the foodstuff manufacturing and processing line, or the like).

What is claimed is:

1. An industrial robot employed in a workplace involved in processing or manufacturing foodstuffs, comprising:
   a robot mechanism with at least 3 axes providing linear and rotational movement, having a sealed structure that contains machine elements and lubricating oil, which is not harmful to human bodies, to lubricate the machine elements,
   wherein the sealed structure includes seals formed of a material that is harmless to human bodies, the seals being incorporated into the machine elements of the robot mechanism.

2. The industrial robot according to claim 1, wherein nitrile rubber or a fluorine resin is used as the material for the seals.

3. The industrial robot according to claim 1, further comprising:
   an arm; and
   a motor providing a rotational drive, and
   wherein the machine elements include at least one of gears and a speed reducer supplying rotational drive to the arm by transmitting the rotational drive of the motor to produce movement of the arm about a full rotational axis of the industrial robot.

4. The industrial robot according to claim 1, further comprising:
   a robot hand; and
   a motor providing a rotational drive, and
   wherein said machine elements include at least one of gears and a speed reducer supplying rotational drive to the robot hand by transmitting the rotational drive of the motor to produce movement of the robot hand about a full rotational axis of the industrial robot.

* * * * *

UNITED STATES PATENT AND TRADEMARK OFFICE
CERTIFICATE OF CORRECTION

PATENT NO.   : 6,484,067 B1
DATED         : November 19, 2002
INVENTOR(S)  : Satoshi Kinoshita et al.

It is certified that error appears in the above-identified patent and that said Letters Patent is hereby corrected as shown below:

Column 1,
Line 58, after "safety" delete ".".

Column 4,
Line 3, change "overlook ed" to -- overlooked --.

Signed and Sealed this

Twenty-fifth Day of March, 2003

JAMES E. ROGAN
*Director of the United States Patent and Trademark Office*